US008915743B2

(12) United States Patent
Meglan (10) Patent No.: US 8,915,743 B2
(45) Date of Patent: Dec. 23, 2014

(54) SURGICAL BURR HOLE DRILLING SIMULATOR

(75) Inventor: Dwight Meglan, Westwood, MA (US)

(73) Assignee: SimQuest LLC, Silver Spring, MD (US)

( * ) Notice: Subject to any disclaimer, the term of this patent is extended or adjusted under 35 U.S.C. 154(b) by 1208 days.

(21) Appl. No.: 12/536,839

(22) Filed: Aug. 6, 2009

(65) Prior Publication Data

US 2010/0041004 A1 Feb. 18, 2010

Related U.S. Application Data

(60) Provisional application No. 61/088,249, filed on Aug. 12, 2008.

(51) Int. Cl.
*G09B 23/28* (2006.01)

(52) U.S. Cl.
CPC .... *G09B 23/283* (2013.01); *G05B 2219/45117* (2013.01); *G05B 2219/40619* (2013.01)
USPC .......................................... 434/274; 434/262

(58) Field of Classification Search
USPC ............... 434/262–275; 703/7; 345/156, 161, 345/184; 600/424
See application file for complete search history.

(56) References Cited

U.S. PATENT DOCUMENTS 5,576,727 A * 11/1996 Rosenberg et al. ........... 345/179
6,223,100 B1 4/2001 Green
7,249,951 B2 * 7/2007 Bevirt et al. .................. 434/262
2004/0009459 A1 * 1/2004 Anderson et al. ............. 434/262
2007/0250078 A1 10/2007 Stuart

FOREIGN PATENT DOCUMENTS

WO 03/077101 A2 9/2003

OTHER PUBLICATIONS

International Search Report and Written Opinion issued in corresponding international application for PCT/US2009/053105, dated Feb. 15, 2011.
International Search Report and Written Opinion for PCT International Patent Application No. PCT/US2009/053105, mailed on Mar. 22, 2010.
European Examination Report issued in corresponding European Application No. 09791271.1, dated Oct. 11, 2011, 5 pages.
European Communication corresponding to EP Application No. 09791271.1, dated Jan. 30, 2012, 4 pages.

* cited by examiner

*Primary Examiner* — Timothy A Musselman
(74) *Attorney, Agent, or Firm* — Pillsbury Winthrop Shaw Pittman LLP (57) ABSTRACT

A system, method and device for simulating a medical procedure include a haptic mechanism controllable to provide feedback to a user manipulating a medical device. In an embodiment, a pair of three degree of freedom haptic devices are coupled to provide six degree of freedom measurement and force/moment feedback to the user. The six degree of freedom haptic device may be configured to provide different resolutions for different degrees of freedom, depending on simulation requirements. In an embodiment, a load cell is used to provide higher resolution in a dimension determined to be of greater criticality to realistic simulation.

21 Claims, 8 Drawing Sheets

SURGICAL BURR HOLE DRILLING SIMULATOR

RELATED APPLICATION

This application claims the benefit of U.S. Provisional Application No. 61/088,249, filed Aug. 12, 2008, the contents of which are incorporated by reference herein in their entirety.

STATEMENT REGARDING FEDERALLY SPONSORED RESEARCH AND DEVELOPMENT

This U.S. Government has a paid-up license in this invention and the right in limited circumstances to require the patent owner to license others on reasonable terms as provided for in US Army contract #W81XWH-05-C-0141 entitled Intracranial Hematoma/Burr Hole and Trauma Flap Simulator and awarded by the Department of Defense.

BACKGROUND

1. Field of the Invention

The present invention relates generally to devices and methods for providing training on medical procedures.

2. Description of Related Art

The removal of materials via cutting tools has been simulated in a number of papers, particularly in the form of machining papers focused on the case of metal removal in industrial machining. In general, such simulations are not conducive to real-time simulation of material removal. On the whole, such papers tend to relate a number of mechanical factors and to provide a connection between inputs (in the form of tool configuration and material being affected) and outputs (in the form of resisting forces/moments/torques and material removed).

In this regard, there have been a number of works in the past ten years relating to small high speed burrs used to remove either bone or dental enamel. Simulation models have been developed for approximating the removal of material as a function of multiple mechanical factors relating to the tool, the material to be cut and their interactions.

SUMMARY

One or more embodiments of the present invention provide an apparatus for simulating a medical procedure that includes the use of a rotatable surgical tool, a six degree-of-freedom ("DOF") haptic device, operably connected to the surgical tool, and constructed and arranged to measure motions of the surgical tool and to apply resistance to the motions in response to computed values for the simulated medical procedure.

In an embodiment, the haptic device includes a load cell constructed and arranged to measure force and moment in a direction along an axis of the surgical tool.

In an embodiment, the haptic device includes a pair of three DOF haptic components, each operably and cooperatively connected to the surgical tool.

In an embodiment, the haptic device includes a pair of three DOF haptic components, each connected at different points along an axis of a shaft by a link such that forces of the three DOF haptic components are transmitted through the links to impart rotational moments and translational forces on the shaft.

In an embodiment, an apparatus for simulating a medical procedure includes a six DOF haptic device, operably connectable to a surgical tool and constructed and arranged to measure motions of the surgical tool and to apply resistance to the motions in response to computed values for the simulated medical procedure.

In an embodiment, a method for simulating a medical procedure includes defining a computer model for a portion of a patient's body, monitoring motions of a tool for performing the medical procedure, and controlling feedback to the tool, based on the computer model.

In an embodiment, the computer model includes a local model and a global model, the local model including information relating to a modeled zone of interaction between the tool and the modeled portion of a patient's body, the global model including information relating to portions of the patient's body that are not directly interacting with the simulated tool.

In an embodiment, the monitoring and controlling feedback in selected degrees of freedom are performed to a first resolution and the monitoring and controlling feedback in another degree of freedom are performed to a second resolution. In an embodiment, the other degree of freedom is an axial direction, and the second resolution is higher than the first resolution.

Aspects of embodiments of the invention may include a computer-readable medium encoded with computer-executable instructions for performing the foregoing method or for controlling the foregoing system and/or device.

Aspects of embodiments of the invention may include a system incorporating the foregoing device and configured and arranged to provide control of the system in accordance with the foregoing method. Such a system may incorporate, for example, a computer programmed to allow a user to control the device in accordance with the method, or other methods.

Additional and/or alternative objects, features, aspects, and advantages of the present invention will become apparent from the following description, the accompanying drawings, and the appended claims.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION

In an embodiment, a device for simulating a trepanning or burr hole operation is provided. A medical manual drill handpiece, for example a Hudson brace available from Rudolph Storz Gmb, is connected to haptic devices in order to provide the user with simulated resistance to the drilling operation. In support of this, a software implementation provides a real-time, or near real-time, mathematical simulation of the mechanics of creating an access hole through the skull using a perforator drill bit in a hand driven drill handle. As will be appreciated, a simulation/feedback device may be used for training of new practitioners, or may find application in conjunction with robotic surgical devices in order to provide for remote surgical techniques.

In use, a user holds a drill handpiece, which is attached to a haptic interface device that monitors six degrees of freedom ("DOF") for tracking the user's movements. Likewise, up to six DOF force and moment feedback may be provided to the user. In order to accurately simulate an interaction with human bone, the haptic device may be designed to provide approximately 40 Newtons (N) of overall (i.e., combination of the two transverse axes and the axial direction) force and 2 Newton-meters (Nm) of overall (i.e., both transverse axes) bending with an additional 0.2 Nm of passive axial torque resistance. In an embodiment, the user is able to continuously rotate the drill about its long axis to enable a typical drilling motion.

Where necessary or desirable, a load cell built into the haptic device may allow the user's application of axial forces along the drill shaft to be monitored. This additional capability may be included, for example, when it is important to increase the limits of resolution for measurement of the user movements in the axial direction. A axial force load cell can provide the possibility of using admittance rather than impedance-based control along that axis in order to provide improved resolution. In particular, in view of the typical feed rate (typically about 0.05 mm/rev) in the axial direction of a burr hole drill, the improved resolution may be useful.

In alternate embodiments, the mathematical model of the bone drilling process itself can be constructed on either a micro or macro level. In general, a micro model would compute the actual process of bone chip removal at the cutting face of the drill bit and sum these forces and moments on the drill along with additional loads occurring along the shaft of the drill as it travels further into the bone (such as frictional contact and bending forces due to off-axis alignment of the drill in the hole). On the other hand, a macro model will generally not compute the individual sampled drill face forces but rather estimate the total force and moment on the drill face as well as the additional drill shaft loads.

Micro models prove to be more general in their abilities to handle unanticipated use patterns, but may be restricted to the few cases that are available and may be difficult to adjust to reflect the behavior observed in real life. Macro models generally provide accurate gross behavior of the response of bone being affected by the drill bit but may have difficulty in generalizing to provide appropriate behaviors in situations that deviate too far from the situational context modeled by the data previously collected and fitted.

In another approach, a hybrid model that uses micro modeling to generate the effect of the drill on the bone locally and to provide an initial estimate of the loads on the drill is used in combination with a macro model used to adjust the overall load experienced by the user as result of their actions. This approach can yield generality in behavior and consistency relative to known characteristics.

In validating models, it may be useful to conduct tests on fresh frozen human cadaveric skull samples where the pose of the user's hands and the drill handle as well as the skull sample are monitored with a motion tracking system while the forces and moments on the skull as well as the axial acceleration on the drill handle are also modeled. A number of these data trials can then be analyzed and distilled into gross behavior patterns for normal hole making. Such model validation can provide a basis for normal, well-executed burr hole creation. On the other hand, for imperfect hole creation additional work may be required. For example, a general burr hole simulation may include defining a means of efficiently representing discrete volumes of bone, developing an appropriate means of computing bone removal in these volumes, developing a normal drilling behavior model as it affects bone removal and provides user feedback, developing a non-normal drilling model that affects bone removal and user feedback, developing visual display of the resulting hole creation during and after drilling, and defining objective metrics that can be automatically extracted.

A simulation approach in accordance with an embodiment can begin with representation of appropriately small discrete volumes (e.g., voxels or cells) around the drill in order to provide a record of incremental bone removal by the drill. The incremental bone removal can be represented, for example, in an occupancy map. The removal of bone from individual cells within the occupancy map is computed by a model of the interaction of the drill face (typically normal force and face velocity/travel) with the bone in the cell (which may include variation in bone density and stiffness across the thickness of the skull). The interaction model thus provides a way of representing the mechanical resistance of the bone to its removal.

The normal drill model handles the individual removal of bone from cells to ensure that the overall result of the many individual cells being affected at once is consistent with the gross behavior measured for skull bone removal. The non-normal bone removal model provides a similar consistency for user behavior that causes the drill bit to work in a less than ideal manner. In each case, the occupancy map modifies the overall result to account for variation in hole geometry as a result of user action during hole creation. The visual display of the hole will generate an external surface, based on the occupancy map, that shows where the bone has not yet been removed. This provides a general rendering of the hole shape no matter what combination of normal and non-normal drilling occurs. Finally, the measured parameters provide an objective measure of how well the user has created the hole in terms of geometric and kinetic parameters monitored during the drilling process as well as how the final hole geometry compares to an ideal hole.

A typical burr hole placement begins with establishing visually where on the skull the hole will be placed. There are standard protocols behind the choice of location depending upon the patient presentation. In general, these are not the concern of the simulation itself but would generally need to be cognitively mastered prior to hole placement. In an embodiment, the simulation may include variations in skull geometry and physical characteristics that depend on the user's selection of head placement prior to drilling.

In a typical surgical environment, a patient will be supine on a table with their head rotated to make the right or left side of the skull accessible from above. The head will be stabilized in order to prevent the drilling activity from affecting the motion of the skull during the operation. Once the desired location for the hole selected, the skin is reseted away to provide exposure to the skull bone. In a model in accordance with an embodiment, the skull is assumed to be stabilized in this manner with the skin already reseted to provide access to the skull bone in the general region where the hole will be created.

In performing the operation, the user holds the hand drill portion of the device with a skull perforator drill bit already loaded, places the perforator perpendicular to the skull at the desired location, and applies sufficient force along the perforator axial direction (i.e., the long axis of the drill bit about which it is axisymmetric) in order to engage the inner clutch. The perforator has an inner section that is freely rotatable relative to the drill handle until sufficient force is applied along its axis to cause the friction clutch between the outer and inner sections of the perforator to engage to the two sections. Thus, when the user presses down and rotates the drill handle, the drill bit rotates with the body of the hand-turned drill. If the user does not apply sufficient force, the perforator drill bit disengages and the drill bit no longer rotates with the handle. On the drill face (i.e. the section that contacts the bottom of the hole), the inner section of the perforator extends out in front of the outer section such that the perforator's inner section first penetrates the inner table of the skull and the perforator disengages from the drill handle. Thus, when the perforator just crosses through the inner cortical bone layer of the skull and is just about to cut into the parenchyma on the outside of the brain itself, the perforator disengages. Because the inner section is forward of the outer section, the perforator is supported by the remaining shelf of bone left around the inner hole, preventing the drill bit from dropping through the skull into the brain.

With the drill bit clutch engaged, the user typically begins to rotate the drill handle clockwise (a counterclockwise rotation will result in a much less efficient hole creation process because of how the cutting edges are built on the drill front face and sides). This rotation is done while keeping the drill axis collinear with the line that is perpendicular to the surface. The rotating is done about the drill's centerline rotation axis at approximately two turns per second with about 90 N of axial force along the drill bit. The user will continue to drill with this combination of the axial force and rotation, gradually removing bone at a typical feed-rate of 0.05 mm/rotation until the inner part of the front drill face punctures the skull. The speed at which the drill penetrates is controlled by the magnitude of the axial force and the speed/direction of rotation as well as the type of bone material that the drill bit cutting surfaces are encountering. A typical skull has three layers of bone that includes inner and outer surfaces composed of harder, denser cortical bone and a middle region consisting of cancellous bone. These sections are typically on the order of 1-2 mm for the inner and outer tables and 4-6 mm for the cancellous section. Note that only material beneath the front face of the drill bit is removed when an ideal drill usage is carried out. The resistance to the drill rotation increases as the drill goes further into the hole. The increased friction is a result of surface friction, as the drill bit increasingly touches the sidewalls of the hole as the drill progresses into the skull.

When the drill is not held perfectly perpendicular to the skull surface, there are typically two additional ways that it interacts with the hole. First, it can be rocked/angulated relative to the ideal perpendicular line that was established when the drill was pressed into the skull surface, i.e., the outer table, and rotation initiated. Second, it can be pushed/translated into the side of the hole once the hole has been initiated. Any movement of the drill relative to its ideal placement along the perpendicular line can be decomposed into a translation and an angulation of the drill relative to that line. In the case of the angular deviation, the drill will touch the side of the hole at the top and bottom of the hole, but do so on opposite sides. When the drill is rotated, additional bone will be cut out of the hole at those locations according to the shape of the drill and how hard it is pressed against the hole edges, and according to how fast it is rotated. This will cause the hole to have wedge-type additions to its outline. The net result for the user is to feel a bending moment resisting their attempt to rock the drill as well as a gradual addition of play/looseness over time as the drill is rocked about the same direction. Note that it is not unusual to precess the drill about the perpendicular axis to form a conically shape hole. It is also possible for the drill to stay largely aligned along a single line that is not collinear with the perpendicular such that a nicely formed hole is created, but it is pointed in the wrong direction. For the side thrust/translation contact, the drill will carve out material all along its face, centered about the direction of drill movement. The user will feel side forces resisting their attempt to move in that direction, with a gradual increase in looseness over time in the direction of translation. Note that after some time of both rocking and translating, the hole become larger than the drill and considerable free motion of the drill (i.e., no force or moment resisting movement) within the hole will be possible.

Once the drill has progressed far enough through the skull, it will break through the inner table and the clutch will disengage the inner drill section from the outer section. At that point, the user's rotation of the drill handle will no longer cause rotation of the drill bit in the hole. At this point, the burr hole formation is complete for the purposes of this training. An instructor will typically assess the quality of a hole based on its placement, trueness to a cylindrical shape, and alignment relative to the line perpendicular to the surface of the skull. Alternately, predetermined metrics for these qualities may be automatically compared to the produced results. For example, a measured deviation from a true normal axis may be calculated and displayed in degrees or other appropriate units.

To create a burr hole from the interaction of the drill bit with the bone as the bit is rotated with a force applied along its axis, there must be removal of bone at the interface between the drill and the bone. Prior to this however, the location of the point and direction of the initiation of hole creation should be precisely/clearly defined. The outer surface of the skull is assumed to be represented by a polygonal model of some appropriate level of detail (i.e., the minimum size of the triangles composing the surface are small enough relative to the local curvature of the skull to not show too large of a surface direction change once triangle normal interpolation and other surface rendering approaches such as bump mapping are applied). Thus, when the cylindrical drill bit approaches the skull, a number of triangles will be near the bit. Note that since the drill bit is not small relative to the skull (it is typically about 14 mm in diameter), it is possible to angle the drill sufficiently far from the line perpendicular (which can be computed by averaging the normals of all the skull surface triangles within the "shadow" of the drill bit face as it approaches the skull) to the local surface such that the edge of the drill can contact the skull rather than the protruding inner section of the drill bit.

In the case of a perforator bit such as a Codman perforator bit, the inner center section protrudes by 2.4 mm with the inner diameter at 11 mm and the outer diameter at 14 mm. Then once the drill is angled away from the centerline perpendicular by more than an angle calculated by arctan(2.4/

1.5)=68°, it will hit the outer edge of the drill instead of the inner section. This is quite a large deviation from the ideal angulation, so it may be reasonable for a model to provide less than this level of deviation. Where a model does allow for this eventuality, an angle this large will result in a force in the direction opposite to the direction of rotation. This force acts as a reaction to the initial contact of the drill blade with the skull surface. This would tend to cause a skip/jump perception to the user, and the model can provide appropriate feedback signals to the haptic device.

The initiation of the hole creation process itself may be defined by a sufficient axial force being applied along the drill axis combined with the drill being rotated while the drill tip is being pressed against the skull surface. When these criteria are met, then drilling has begun and an occupancy map can be defined. A realistic model therefore includes a minimum axial force and rotational velocity that needs to be attained to signal the initiation of drilling. Typical values for axial force during drilling have been measured at 90 N, with the corresponding rotational velocity measured at 2 Hz. Likewise, there is a minimum axial force required to keep the clutch engaged so that the drill bit turns with the drill handle. This force level may be, for example, on the order of 40 N.

Note that placing the drill bit on the skull surface without rotating the drill will produce a strong resisting force against pushing the drill into the skull as well as against translating it from side to side since the drill bit will have considerable friction between it and the skull surface. Typical bone stiffness is on the order of 70,000 N/m (e.g. this yields a required 35 N for a displacement of 0.05 mm) and the friction is considerable (it can be considered essentially stuck in place transversely if there is any force at all applied to the drill), so similar transverse stiffness is appropriate. The computation and application of this force to the haptic device may need to be implemented in a manner that is distinct from the approach chosen for the normal and non-normal bone removal drilling model.

Defining the location of the drill placement and the corresponding line perpendicular to the skull surface at that location can be derived from the polygons under the "shadow" of the front of the drill bit. A "shadow" refers to the polygons on the skull surface that touch or are within the cylinder that is cast/projected forward by the drill bit's outer perimeter, pointing along the center axis of the drill bit, at the moment the drilling initiation criteria are fulfilled. That is, these polygons fall within the shadow of the drill bit. The center of the drill bit determines the drill point on the polygon that it intersects. The line perpendicular to the skull surface may be considered to be the average of the normals of these same polygons. For the situation in which the curvature changes substantially within the shadow polygons, the radius of the shadow cylinder may be shrunk until the standard deviation among the normals drops below a threshold of variation. Alternately, the system may notify the user that they have placed the drill on an area that is not sufficiently smooth.

While it would be unusual if the drill were perfectly aligned, it should, in general, be within some reasonable threshold value of deviation defined by the dot product of the normal and the drill axis. This deviation may be continuously monitored as part of computing one of the performance metrics.

Note that the typical Codman perforator drill bit has a center section that protrudes out of the front of the drill. This center section when uncompressed protrudes out approximately 6 mm, while it extends 3 mm beyond the front when it is compressed. The outer diameter of the drill is 14 mm while the protruding inner spring loaded clutch section is 11 mm.

Thus, when the drill completes creating a hole in the skull by penetrating the inner table with the inner section, there will be a 11 mm hole through the inner table with a shelf 3 mm above this hole and extending out by 1.5 mm, and a 14 mm hole continuing the rest of the way out of the skull.

The geometric data structure representation of the skull bone around the drill supports a general placement and use of the drill bit such that the user can change their mind after initiating drilling and, as a result ceasing the drilling, move and replace the drill elsewhere and begin again. For example, this may arise when the user stops pushing down on the drill with sufficient force to keep the clutch engaged but continues rotating the drill before realizing that it is not removing bone any longer. The user may then stop drilling, possibly lift the drill out of the hole and place it back in again, and then put sufficient axial force on it to re-engage the clutch and continue drilling. The data representation should also support general use of the drill within the hole, which primarily means that the user can possibly vary the drill bit orientation as the drill rotates or can push/pull in any direction toward the side of the hole (i.e., attitudinal or translational errors by the user). This data structure should provide sufficient detail to allow these behaviors to be properly modeled, so that appropriate resistance in force and moment can be provided back to the user and the appropriate gradual removal of the bone as a result of the user's force and rotation of the hand drill can be displayed to the user. All of these computations on which parts of the occupancy map are affected by the user's actions with the drill should occur in real-time. For haptics to provide a hard surface feel, an appropriate response rate may be considered to be on the order of kHz.

One approach for potentially improving computational efficiency is to use two occupancy maps: a global one that reflects the user's actions over the entirety of the simulation and which is used for generating graphics representations of bone surface state, and a local one in a region proximate to the drill position. The local one may be used to compute more precise effects of the drill on the bone surrounding it. In an embodiment, the local map would be used for the majority of drill-bone interaction computations, and its information is transferred asynchronously to the global map. This global map would also be used to transfer the results of any previous hole drilling attempts to a newly placed local map prior to initiation of another hole creation process simulation.

In this embodiment, the global occupancy map would be generated by voxelizing polygon surface models of each of the three layers of the skull. These models may be initially constructed to form closed surfaces (i.e., no holes) so that they allow flood-fill type voxelization. Models may be created on one side of the head for at least the parietal bone, with additional ones in the future for the frontal, temporal, and sphenoid bones. The spatial density of the voxels needed within the bone models should be sufficient to generate detailed visual results of the hole creation as well as provide an effective transfer mechanism for moving results from previous drill uses into the local occupancy map of a new drill hole occupancy map. The three layers of bone in each skull bone will eventually have different material properties (such as Young's modulus and yield strength) as well as distinct visual appearances assigned to them. The material properties in particular are useful to guide the computation of the physics of hole creation.

The global occupancy map is not intended to directly interact with the drill. Instead, it would receive periodic or real-time updates from the local occupancy map as the local map is updated. The concept is that the local map will be more efficient at computing which voxels are affected by the drill and when the local voxels have been modified by the drill. The results will be moved to the global map. The primary reason for the global map's existence is to support the placement of multiple drill holes, give a simple mechanism of generating a data set that can used for some form of volume surface rendering, and to provide a mechanism to enable the geometry of the skull bones to be included (i.e., the irregular boundaries that do not match the regular grid nature of the cylindrical local occupancy map). For the multiple holes situation, the global map provides a bridge between these separate placements and future placements as well as provides a way of generating an overall image of the bone surface resulting from these multiple placements. The mapping of local voxels to the global map should be a straightforward issue since the local map is to be constructed in a cylindrical fashion. The map will be placed in space (position and orientation) at the time of initiation of hole creation. Thus, there will be a rigid body transformation from the local map to the global map. Interpolation of the local values to the global voxels is probably needed to allow the effect of a local map voxel to be spread amongst its several nearest neighbors in the global map. This is primarily the case when partially filled voxels are included to account for resistance to material removal. One approach for accelerating the map transference process is based on knowing the position and orientation of the drill cylinder relative to the coordinate frame axes defining the skull voxel grid.

The intention is that the local occupancy map will be used to define a cylindrical zone around the drill bit once it has begun to remove bone from the skull. This map defines a gridwork of small volumes (e.g., non-square, circumferential section voxels) where bone can be fully present, partially removed, or fully removed. The occupancy map does not get defined until the drilling process has been initiated. It will have a locally defined coordinate system whose placement and orientation is set at the time of drilling initiation. Thus, the definition of drilling initiation is a basis for when and how this pose transform is set, as previously described.

The drill may be thought of as a cylinder that moves through space, and once the hole is begun it will not deviate excessively from the axis that was defined when drilling was initiated. Thus, intersecting the cylindrical shape of the drill with the cylindrical grid pattern of the occupancy map should be computationally efficient because the transformation between the two coordinate frames and the algebraic descriptions of the two should suffice for making calculations as to where they overlap. It is envisioned that this is a relatively simple, efficient way of computing drill to hole bottom and to side wall contact. When combined with erosion relationships, this should prove effective at computing the change in state of the voxels contacted by the drill surface.

Organizing the computations into radially-directed planes (i.e., passing through the center line of the drill and pointed outward at some predefined sampling amount around the circumference of the drill cylinder) that are attached to the drill bit and that intersect with the occupancy map cylinders could be an effective means of speeding calculations since the plane to cylinder computation is algebraic. The intersection result(s) of the fast, simple calculation can then be distributed into the sampled voxels in the occupancy map near the intersection of the plane and cylinder(s). Note that the calculation can be further decomposed/simplified into a line and circle intersection at each slice of the occupancy map and then updated based on the limits of the drill diameter in each specific occupancy map circle. The angulation of the drill cylinder relative to the occupancy map cylindrical element arrangement makes the length of the line segment representing the cylinder vary circumferentially around the occupancy map. This is because the cross section of the drill in the plane(s) of the occupancy map becomes elliptical. However, this variation of length as a function of the circumferential angle is an algebraic relationship and therefore straightforward to include. The final refinement is to account for the ending of drill bit at the front (the back should not be an issue since the drill bit should never make it so far into the skull that you reach the limits of the drill length on the back side). Again, this can be included algebraically to account for the finite length of the drill bit.

An implementation approach that may simplify things is to organize the cylindrical occupancy map in slices transverse to the its long axis, with circles of voxels in each slice. These rings all identically have the same number of elements, but their corresponding radii vary. This may be applied to organizing plane-based calculations for intersections as well as sampling/distributing of the results to the voxels. Alternative approaches, such as using cylinders or radial planes to organize the voxels, could be used.

Note that if the collision between the voxels of the global map and the drill can be computed rapidly enough, a purely global occupancy map could be used rather than having the local map that is transferred to it. As computational resources become less expensive, the two-tiered approach described above may be dropped in favor of a global approach. Various solutions have been proposed for efficient collision computations between polygon objects and voxel representations (as well as efficient voxel object to voxel object collision). In general, these approaches use various types of hierarchical bounding volumes to speed the voxel collision calculations. Likewise, the approaches have been proposed to simulate the use of high speed burrs to remove bone for applications such as temporal bone surgery and tooth drilling. These approaches are not entirely applicable to a burr hole, because the drill bit in use for burr hole creation is considerably larger than e.g., dental burrs, resulting in much more contact occurring over a larger surface.

If the local cylindrical occupancy map is used, then its dimensions can be estimated as follows. Once the drill hole creation has been initiated, the only deviations from a perfect alignment of the hole with the cylindrical map axes occur as a result of transverse translation of the drill or rocking/wobbling of the bit about its contact point in the bottom of the hole. Thus, data observed on these two behaviors can be used to estimate how much larger the cylindrical map should be than the diameter of the drill bit. Measured data shows a static deviation from the perpendicular to the skull surface in the initial hole direction of up to 30° with an additional cyclic rocking of less than 10°. The static offset may not be that important in estimating the size of the cylindrical grid because this would be the axis of the occupancy map's coordinate frame and would tend to imply that the drill was placed poorly relative to the ideal alignment. The rocking angle is the measure that is important to estimating the cylindrical grid size. The data shows a maximum skull thickness of 6 mm, but in order to provide additional margin for variation or error, 100 mm may be used as an upper limit in estimating the maximum number of elements. Thus, the additional radial movement caused by rocking from the bottom of the hole would be $(10 \text{ mm})/\tan(80°) = 1.76$ mm. The typical drill is 14 mm in diameter, so, in order to provide for a few millimeters of additional radial distance out from the center line of the cylindrical coordinate frame, an upper radius of approximately 10 mm may be set. In order to provide additional leeway for particularly poor done drilling scenarios, an upper limit of 14 mm could be used.

Note that the situation at the front face of the drill, i.e., the bottom of the hole, is different than that on the sides. For the area in the cylindrical map in front of the drill face, a primary variable is the axial thickness (i.e., the dimension of the slice along the long axis of the cylindrical map) due to the slow feed rates observed (on the order of 0.01-0.05 mm/s). Either very thin slices will be used (on the order of 0.01 mm) or a method of handling partial removal of material from the voxel could be implemented. A partial removal approach as part of the erosion approach to bone removal from the voxel seems reasonable, but it is expected that the same effect could be simulated by assigning a decrease in stiffness or some other quantity that represents the voxel as a whole.

Another simplifying assumption that can be implemented in an embodiment is that the radial density of the elements that fall within the front face of the drill may be lower than those surrounding the drill beyond its outer circumference. The center core elements of a cylindrical occupancy map are primarily removed by the front face of the drill bit while the elements outside of the drill bit diameter will be largely removed by the sidewall of the drill. These outer rim elements should be defined to have some maximum circumferential length that they span. For a maximum, diameter of the map of 34 mm (14+10+10) and a maximum element length of 0.5 mm, this yields about 214 elements around the circumference. Some value either somewhat below or above this could be chosen for convenience. In an embodiment, the system could have a user-selectable or otherwise variable parameter for this value.

The thickness of the elements moving out radially is governed by the granularity of the representation required to provide an effective experience for the non-ideal use of the drill. When computing the interaction between the drill and individual voxels, the sum of the aggregate interactions of all the individual voxels will determine the haptic response to the translating and/or rocking the dill from its ideal alignment. The other determining factor will be the visual result of eroding away this elements in terms of how the user perceives the non-ideal hole formation, primarily after they have completed drilling, since it is quite difficult to see the hole being formed as one is operating the manual drill handle. It is possible that the visual element density could be higher that the haptic elements, though this may be more relevant to embodiments in which a partial material removal approach is taken on the haptic elements and some form of directionality for that removal is used to generate interpolated voxels for graphics rendering.

One approach to determining the appropriate radial element thickness is to use the typical feed rates in bone removal that could be expected for translation or rocking, which may be assumed to be on the order of 0.01-0.05 mm/s. Using a partial volume material removal approach that takes into account directionality may allow for thicker elements to be used radially. Because feed rate and voxel size define voxel removal time, voxel size can be limited in order to reduce that time. An element thickness that achieves a 2-3 removal sec. time may be appropriate, corresponding to approximately 0.1-0.15 mm, though a larger 0.2 mm voxel may be sufficient.

Thus, if no directional accounting for partial volume bone removal can be implemented, it would seem that the appropriate cylindrical grid is on the order of 200 elements in circumference, 50 (10/0.2) elements radially and 50 (10/0.2) elements in depth for portions outside the drill diameter. On the other hand, inside the drill diameter, an appropriate grid may be on the order of 20 elements in circumference, 7 elements radially and 50 (10/0.2) elements in depth. The total number of elements could therefore be along the lines of 500,000+7000=507,000. This number can be considered to be moderately large for the purpose of mathematical simulation using contemporary computing resources.

Use of macro and micro models have been previously mentioned. Micro models inherently require the use of some means of simulating the gradual removal of bone as the cutting blade interacts with the bone, referred to herein as erosion. Macro models also require something along these lines to support the general use of the drill against the bone, especially in the case of non-ideal use of the tool. In the micro model case, the cumulative results of all the simulated interactions of the drill with the voxels contacted by the drill edges when the blades move through the voxels are derived from the voxel-based erosion calculations. In the macro case, the individual voxel erosions still need to be computed in some form because the relative occupancy of voxels contacting the outer edges of the drill can be used to modify the three macro behaviors (axial drilling, transverse motion, and rocking motion) to reflect previously removed bone surrounding the drill.

The removal of bone within voxels is a gradual process where the cutting blades of the drill bit slice off pieces of bone (note that for a 2 Hz rotation with a 14 min bit, we have a blade velocity of about 9 cm/s). For the purposes of this effort, this removal is assumed to be homogenous within the voxel, i.e., the voxel is the smallest measureable unit. The decrease in material within the voxel is equally distributed throughout the voxel no matter what location and direction the blade has as it moves through the voxel. Two situations occur when a blade encounters a voxel: either it passes through a portion of the voxel or the voxel is fully covered by the blade as it moves through.

A simplified representation of the material removal process can be thought of as a two step process. The first is an elastic contact step for the tool penetrating the voxel(s). The step is essentially an implementation of the classic god-object contact force algorithm implemented on a voxel-by-voxel basis. The second is the material removal itself.

Material removal results from moving a cutting blade across the material at some orientation relative to the material surface (it could also be relative to the totality of the voxel itself if the blade has gone all the way through the voxel) while applying a normal force to the surface of the material that forces the blade into the material. The material resists the blade pushing into it, so a resisting force is felt (i.e. the result of the god-object computation). To make the blade move forward through the material, an additional force is applied to push it (this is the cutting force but can also include a friction force). This force typically is applied to move the blade that is itself attached to some form of circular cutting tool so that the blade force is ultimately supplied by torque to the tool. This resisting torque and the resulting amount of material removed as a function of each pass of the cutting blade through the material are typical output quantities while the blade description, the material mechanics, and the normal force are the inputs.

A simple way to implement the material removal step is to use the mechanical work supplied by the drill bit combined with a value for the energy required to fully remove the material from the hole. This generally allows a gradual removal of the material as the work done by the drill over time becomes sufficient to remove all the material. Partial removal (and therefore a change in the voxel's mechanical properties) will take place incrementally until the full amount of energy required to clear the voxel is applied by the drill to the bone. All the while this removal process is ongoing, the god-object elastic contact model will produce a normal and transverse force on a per-voxel basis that can be used to estimate the contact forces encountered by the drill. The forces, when combined with the drill geometry, will also provide the axial and transverse force, bending moment and axial torque resistance to rotation. This last computation is effectively the micro-model. For the macro-model, the superposition of the axial force, bending moment, and transverse force would be computed based on the state of the voxels in contact with the drill and using a model that takes into account how much of the bone contact with the drill front and sides is still intact, and modifying the normal models accordingly.

The macro approach to modeling the connection between user actions with the drill and the resulting forces/moments felt as a result and the material removed is based on both prior research work as well as experimental cadaveric skull drilling data that we have collected.

When there is a normal drilling process perpendicular to the surface of the skull (meaning that the drill axis is perfectly aligned with that line perpendicular to the surface so that there is no shear or bending from side contact with the hole walls), the independent parameters of the process are the thrust (or axial) force, the drill rotation rate, and the stiffness of the bone material. The dependent (output) parameters are the axial torque and the axial displacement of the drill bit into the skull bone as bone is removed. In addition, the axial torque resisting drill rotation has been shown to be a function of the depth of the drill into the hole it is forming (to be more precise it is a function of the side wall contact area, which includes the diameter of the drill in addition to the drill depth). Thus, axial torque is a function of both the drill bit cutting face removing material as it progress into the skull and the frictional forces on the side of the drill body as it rubs on the drill hole sidewall. The first factor depends on thrust force, rotation rate and bone stiffness while latter is a function of hole depth, since it comes from side wall friction. For the non-perfect case, misalignment of the drill in the hole would amplify the frictional forces and result in additional torque resisting axial rotation. Thus, the model for the dependent variables for the perfectly aligned drill bit can look in general terms as follows:

$$t_a = t_f(f_a, \omega_a, E, r) + t_w(z_a, r) \qquad \text{(Eqn. 1)}$$

$$\frac{dz_a}{dt} = g(f_a, \omega_a, E, r)$$

$t_a$ = axial_torque $t_f$ = torque_on_drill_face $t_w$ = torque_on_drill_sidewall $f_a$ = axial_thrust_force $\omega_a$ = axial_rotation_rate $E$ = bone_stiffness $r$ = drill_bit_radius $z_a$ = axial_depth_of_drill_bit_face $g$ = function_defining_change_in_axial_depth A basis for estimating the difference in stiffness between cortical and cancellous bone has been shown. On average the difference in elasticity between cortical and cancellous bone is a multiple of 2 (2×). In addition, information on the force encountered by a drill going through the femur as a function of material at various depths has been developed. This also shows an approximately 2× increase in force on the drill as it penetrates cortical versus cancellous bone. Thus, it can be assumed that cortical bone will provide twice as much resistance to a drill passing through it as would cancellous bone. In an embodiment, this ratio is not hard coded, but rather is the result of relative magnitudes of the modulus of elasticity for each of the materials. That is, force is a derived parameter rather than a defined one.

Relations between the applied axial pressure on the drill bit and the observed feed rate (mm/rev) as well as on the observed axial resistance torque have been shown. This work was carried out for several specific drill bits on compact (i.e. cortical) bone specimens while the drill rotation rate was held constant at either 40 or 1150 rpm. These two relations are in the form of power equations:

$$f = Bp^x \qquad \text{(Eqns. 2 and 3)}$$

$f$ = feed_rate (mm/rev)

$p$ = pressure (N/mm$^2$)

$B$ &$x$ = experiment_derived_coefficients $$\frac{T}{A} = Cf^y$$

$T$ = torque (Nmm)

$A$ = cross_sectional_area (mm$^2$)

$C$ &$y$ = experiment_derived_coefficients

As an example of the values that these equations yield in practice, for the particular case of a 2.77 mm diameter surgical drill with a rotation rate of 40 rpm, values may be derived as:

$$f = 0.00038p^{2.2} \qquad \text{(Eqn. 4)}$$

$$\frac{T}{A} = 0.016f^{0.39} \rightarrow \frac{T}{A} = 0.00074p^{0.86}$$

Figure 5:
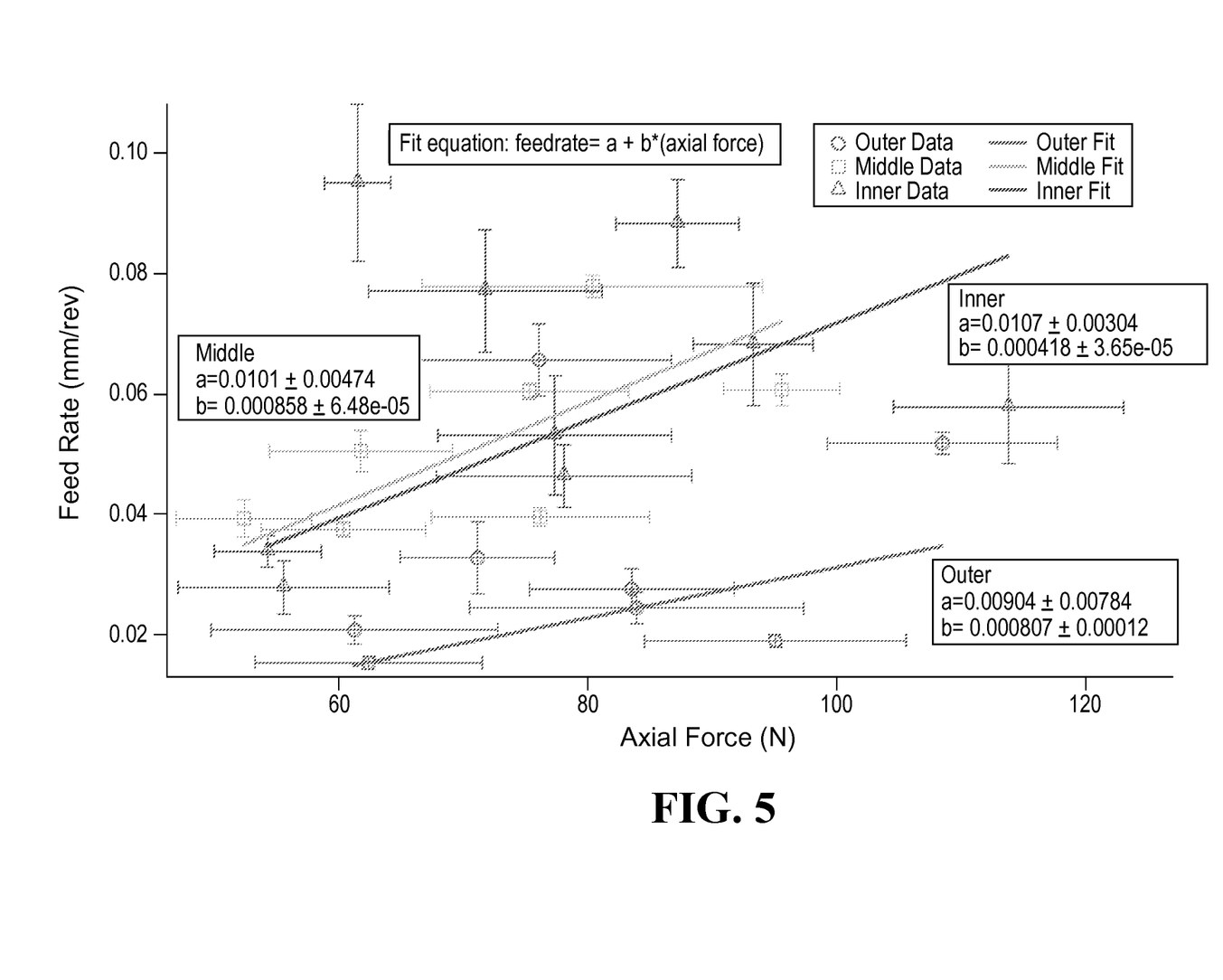
FIG. 5 is a graphical view of data that is relating feed rate to axial force for a particular burr hole perforator bit in accordance with an embodiment of the present invention.

These values would be scaled up to accommodate a burr hole perforator bit of 11-14 mm in diameter. Likewise, FIG. 5 shows empirical results.

The correlation between depth and the additional resisting torque estimated may be expressed by:

$$T_c = \frac{\tau A_c d}{2} \qquad \text{(Eqn. 5)}$$

$$A_c = \frac{1}{2}\pi dh$$

$T_c$ = contact_torque $A_c$ = contact_area $d$ = drill_diameter $h$ = hole_depth $\tau$ = circumferential_shear_traction_stress Experiments have shown that $\tau$ was 0.13

$$\frac{N}{m^2}$$

so this added axial torque can easily be incorporated into the simulation. For a 14 mm diameter drill bit, this would give an added torque of 20 Nm for each additional millimeter of depth drilled.

As noted above, provisions may be made for the effect of prior removal of bone as a result of the drill bit being oriented differently or translated within the hole relative to its ideal position and alignment. This will have resulted in bone being previously removed that would normally be in contact with either the front or sides of the drill as it progresses in its hole creation. An approach to adjusting the above normal, ideal equations to provide effects from prior drilling is to reduce the result by the ratio of the actual contact area to the ideal contact area. So knowing which voxels are in contact with the drill surface and which of those have already had their material removed is useful to do this adjustment. This may be done on the basis of the occupancy map, for example.

In addition to the axial forces and torques resulting from properly holding the drill, embodiments may include incorporation of mathematical approximations of the non-axial, non-ideal loading that results from inappropriate use of the drill on the skull. There are two sources of this added load: angling the drill relative to the hole it was created, and pushing/pulling in a side to side manner as the drill goes further into the hole it is creating.

The first case generates a bending moment from an approximation of two-point contact on the drill on opposite sides: at the tip and the base of the drill body in the hole it has formed. These contact forces can be estimated as a local stiffness resisting the drill's impingement into the hole walls. This relation is also a classic mechanics of materials problem dealing with Hertzian contact stress distributions on a cylindrical surface. It has an analytic solution that can be used in the simulation. Note that the contact loads that generate the bending moment also contribute additional axial torque resistance since they increase the shear force that resists rotation.

The other contributor to non-ideal loads experienced by the drill bit, and hence the user driving the handle, is the shear force due to translating the drill from side to side relative to the hole centerline axis. This additional force on the drill face results from the drill compressing against the drill hole sidewall, producing both a side force and an additional axial rotation resistance from increased friction. This situation is similar to the Hertz contact problem for bending moments. Again, an analytic solution is available for possible inclusion in the simulation.

Figure 9A:
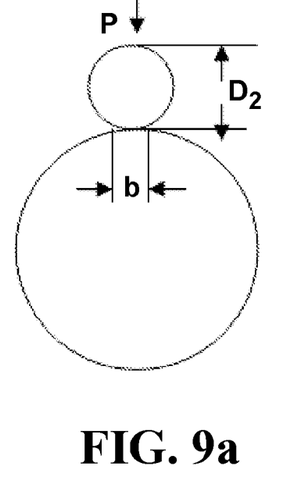
FIG. 9a illustrates a first example of cylinder-to-cylinder contact.
Figure 9B:
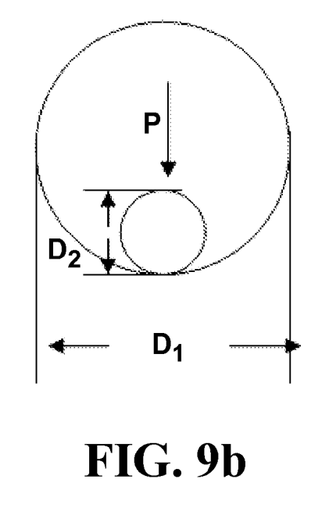
FIG. 9b illustrates a second example of cylinder-to-cylinder contact.

The following known formula for cylinder-to-cylinder contact, two configurations of which are shown in FIGS. 9a and 9b, can be adapted. The stress on a major semiaxis is calculated:

$$\text{Max}\sigma_c = 0.798\sqrt{\frac{p}{K_D C_E}} \tag{Eqn. 6}$$

In this formula, p is the load per unit length (pounds per linear inch).

$$K_D = \frac{D_1 D_2}{D_1 - D_2},$$

where $D_1$ is the diameter of the smaller body and $D_2$ is the diameter of the larger body.

$$C_E = \frac{1 - v_1^2}{E_1} + \frac{1 - v_2^2}{E_2},$$

where v is the Poisson's ratio of the bodies and E is the modulus of elasticity of the bodies.

The width of the rectangular contact area, can be calculated as $$b = 1.60\sqrt{pK_D C_E} \tag{Eqn. 7}$$

This can be used for a basic estimate of the load on the cylinder wall during contact, but the actual distribution of the stress over the contact area has not been found in a form that is readily programmable. In an embodiment, a form of a parabolic equation for the distribution of the stress over the contact area may be used.

Figure 1:
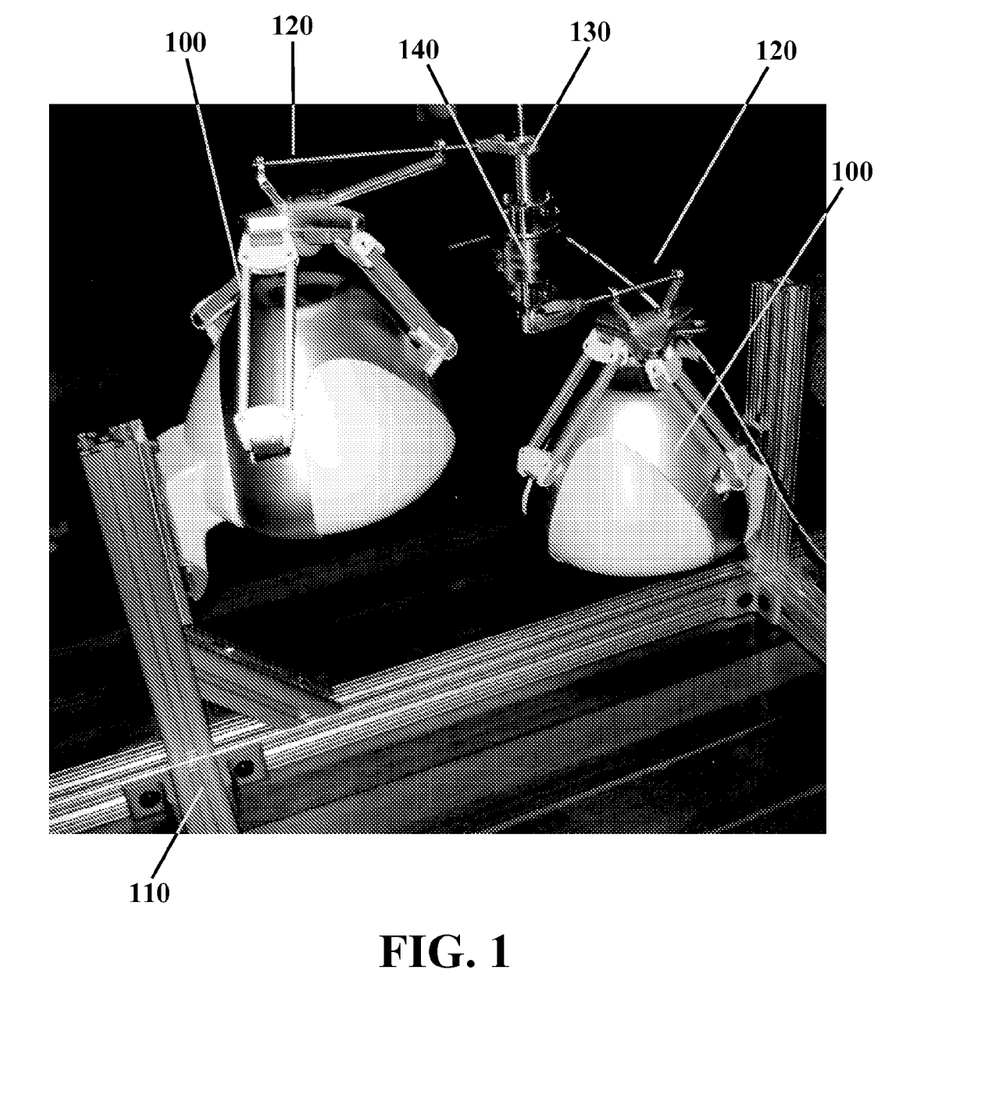
FIG. 1 is a side view of a feedback unit in accordance with an embodiment of the present invention.

FIG. 1 illustrates a pair of three degree of freedom (DOF) haptic devices 100 attached to a supporting frame 110. For example, suitable devices of this type are sold under the Falcon brand name by Novint of Albuquerque, N. Mex. The devices are further attached to a pair of links 120 that transmit motions of the haptic devices to a central shaft 130 at different points along the shaft, allowing for rotation of the shaft about the x and y axes (where z is taken to be the vertical, or axial direction of the shaft). Likewise, motions of the shaft are transmitted along the links to be measured by the haptic devices, an output of which is fed to the computer controlling the simulation. The output of the haptic devices is used as an input to the model described above.

Measurement of rotational motion about an axis of the tool may be implemented, for example, using an encoder (not shown in FIG. 1), for example mountable on the axial shaft of the device. Orientation of the tool, which is the movement about the rotational axes that are not aligned with the axis of the tool, can be derived by mathematically combining the positions of the pair of three DOF devices 100. A load cell can provide rotational monitoring of the forces along the tool axis or can be generalized to monitor all three axes of force and moment applied to the tool. As described above in relation to the axial direction control, use of a load cell can enable admittance control for axial translation or in its more generalized configuration, can be used to control both rotation and translation along all three axes. While impedance control measures position and applies force, admittance control measures force and applies (intended) position.

As shown, resistance to the rotational motion is provided by the a torque unit 140, visible on the shaft 130 of FIG. 1. The unit may be, for example, a current-controlled magnetic particle brake, such as those available from Placid Industries of Lake Placid, N.Y. The brake applies a retarding torque on rotational motion of the surgical tool, simulating the torque that must be applied to it by a user who performs the actual procedure. As can be appreciated, varying the current to the brake allows for changes in applied torque, simulating variations either due to changes in the mechanical properties of the body structures with which the simulated drilling is interacting, or due to misalignment of the tool.

Figure 2:
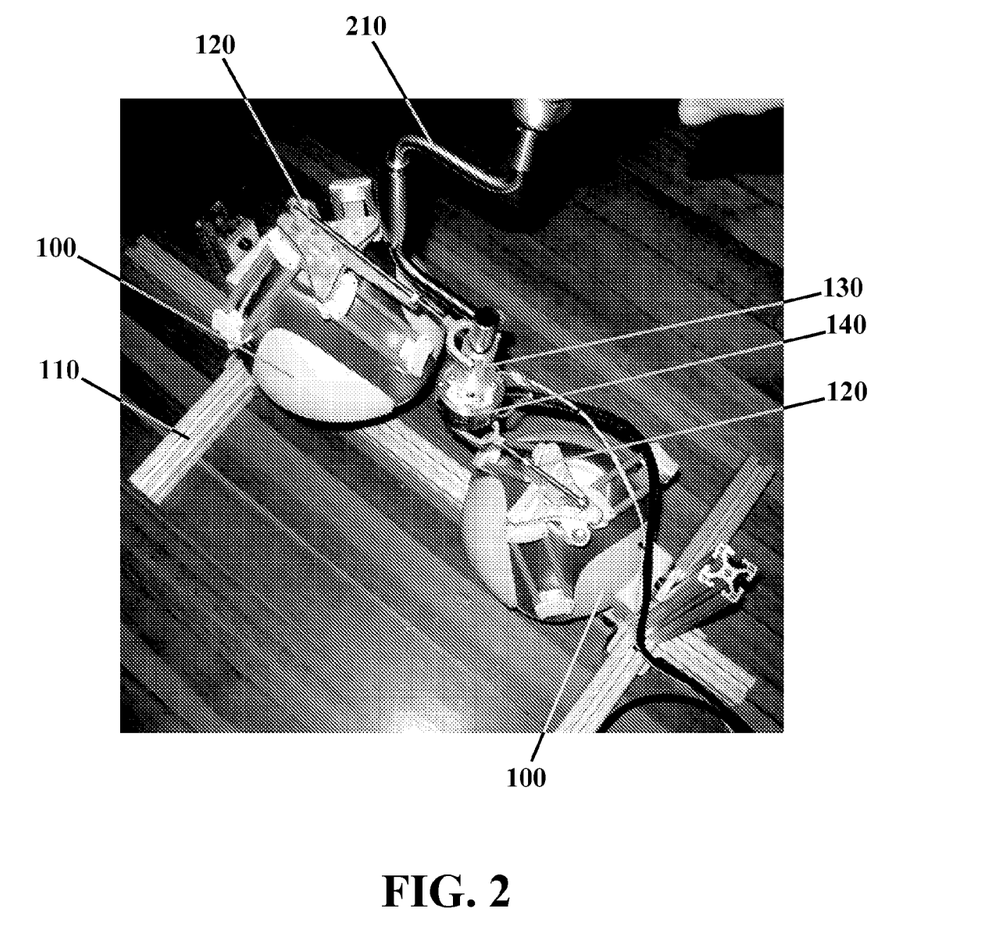
FIG. 2 is an overhead view of the feedback unit in accordance with an embodiment of the present invention.

FIG. 2 illustrates the same assembly, but includes a view of the hand drill 210 that is connected to the shaft of the simulator.

Figure 3:
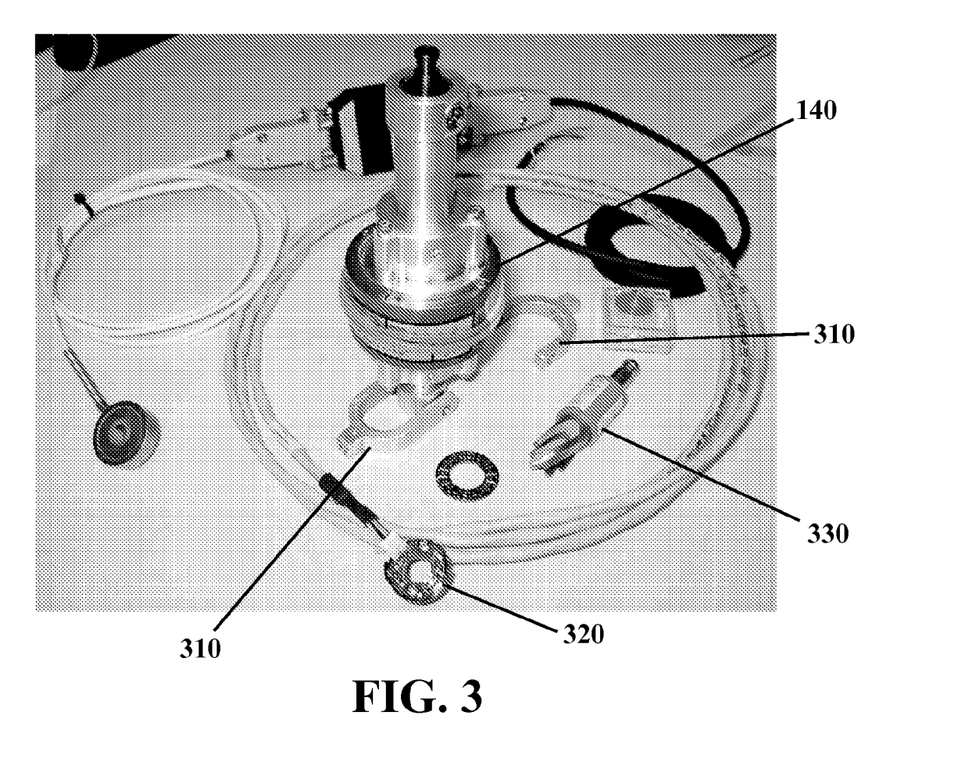
FIG. 3 is a view of a torque-applying assembly from the feedback unit in accordance with an embodiment of the present invention.

FIG. 3 shows the torque unit 140, the end effectors 310 of the links 120 of FIG. 1, electrical connections 320 for interfacing with the controller, and an example of a burr hole drill bit 330 having a clutched central perforator.

Figure 4:
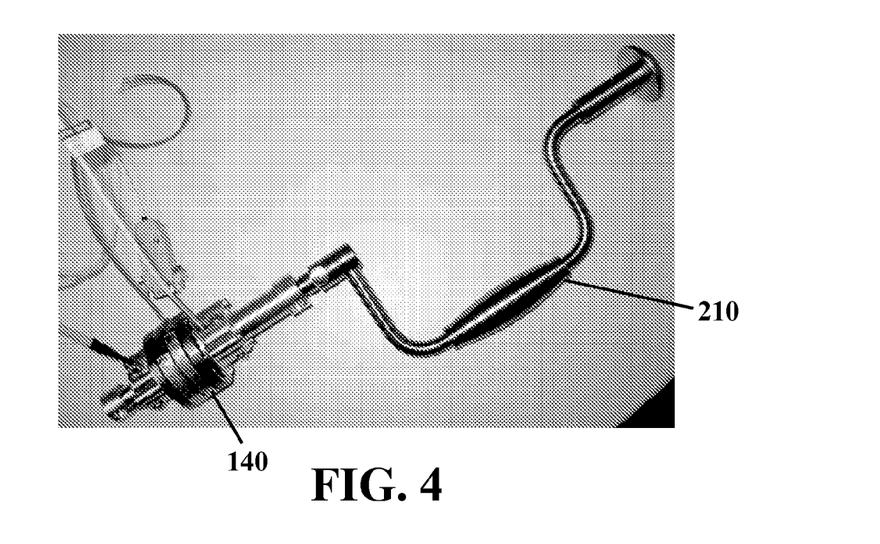
FIG. 4 is a view of a manual drill handpiece operably connected to the torque-applying assembly from the feedback unit in accordance with an embodiment of the present invention.

FIG. 4 shows the hand drill 210 attached to the brake and associated electrical connections.

A method of evaluating a simulator in accordance with an embodiment of the invention may include the extracting of metrics of performance from the simulation and storing the metrics for future evaluation. Furthermore, such metrics may be used to assess a relative performance between individuals. Examples of such metrics may include total creation time for the hole, speed of rotation of drill (average and variation), hole geometry relative to an ideal shape, alignment of the drill relative to its ideal orientation (i.e., perpendicular to the surface), alignment of the drill over the course of the hole creation relative to its initial orientation (variation within cycle as well as entire period; average and variation), reaction time to clutch release (at hole completion or due to insufficient pressure), non-ideal forces/moments (though it can be argued that these duplicate mis-alignment measures) including time variation within cycle(s) as well as over the entire period, and error events such as premature drill lift, improper placement, and lack of noticing hole completion.

As display device may be included to allow the display of the simulated hole. The display of the resulting hole shape can be made by either a polygon rendering of the extracted external surface defined by the voxels (i.e., an iso-surface extraction along the lines of marching cubes) or via some form of true volume rendering. Either approach is acceptable as long as the time lag between the updating of the voxels due to the simulation and the visual rendering of the result is not longer than 1/30 of a second. In addition, the draw time for the image should be within 1/30 of a second and the visual appearance of the surface should be acceptable to a clinician (i.e., that it sufficiently represents the result of their actions). In addition, display of corrective information such as ideal alignment versus the current alignment of the drill, the total and distributed forces on the drill, the voxels currently being affected by the simulation, etc., may be included. This information may both provide a basis for refining the simulation and to assess its validity upon delivery. Finally, the rendering of the voxel-derived hole shape may be blended with the polygonal models of the skull to provide an acceptable overview image of the scenario during the hole creation process.

FIG. 5 shows a relationship between a feed rate (i.e., a rate at which a drill bit is being fed into the bone) and axial forces experienced by the drilling device (and fed back to the user) in an embodiment. As may be seen in the Figure, the greater the feed rate, the larger the force experienced by the user.

Figure 6:
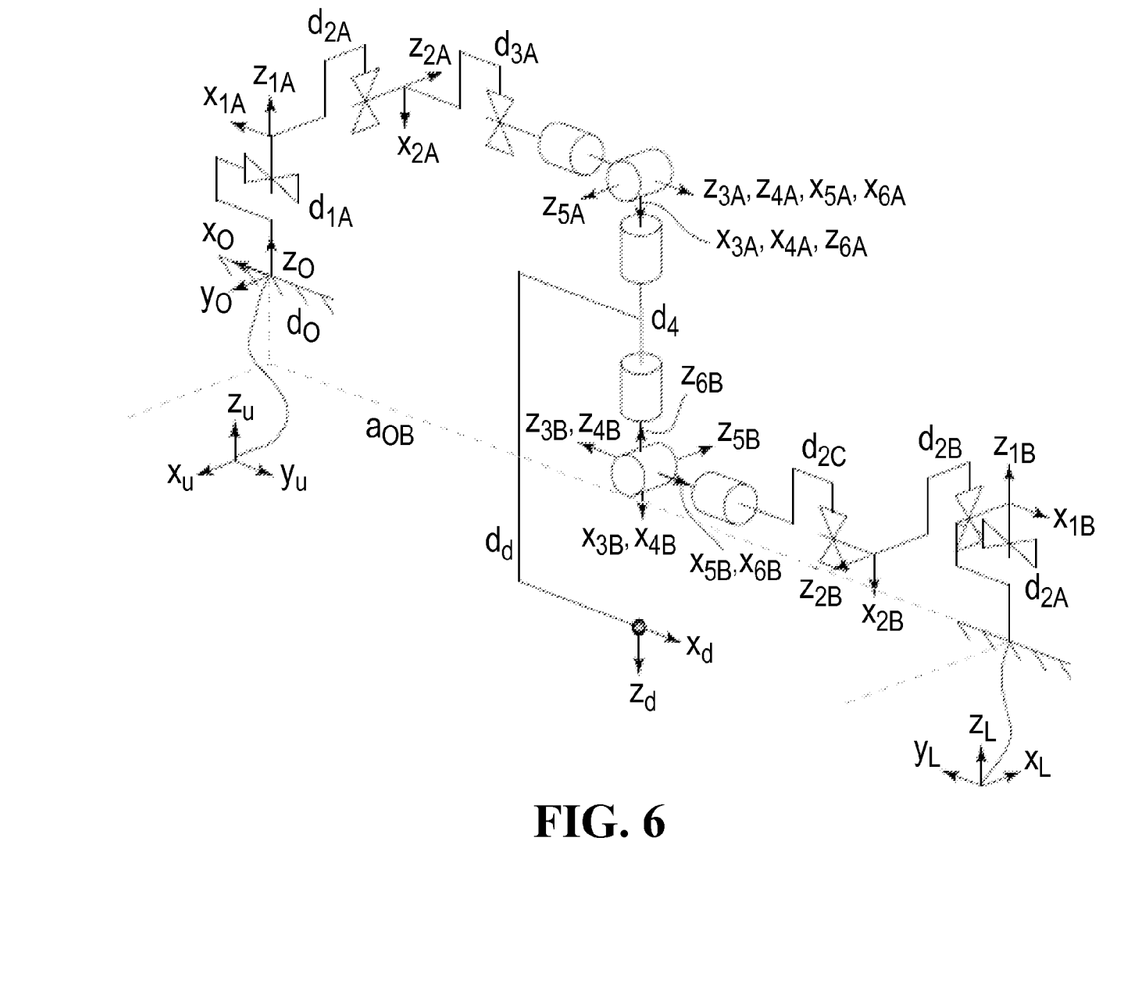
FIG. 6 is a kinematic representation of a pair of three DOF haptic devices linked to a centrally mounted tool shaft.

FIG. 6 is a kinematic diagram modeling the combined system of two 3DOF haptic devices 100. Two frames of reference, an upper frame of reference is grounded at the position labeled $x_U$, $y_U$, $z_U$ and a lower frame of reference is grounded at the position labeled $X_L$, $Y_L$, $Z_L$. Each position and ground is associated with a respective one of the haptic devices 100 as shown also in FIG. 1. Each haptic device contributes to the three translational degrees of freedom (bowties) and three rotations (cylinders). The labels of each joint in the kinematic diagram correspond to parameterizations of the overall kinematic system as is understood by the skilled artisan.

Figure 7:
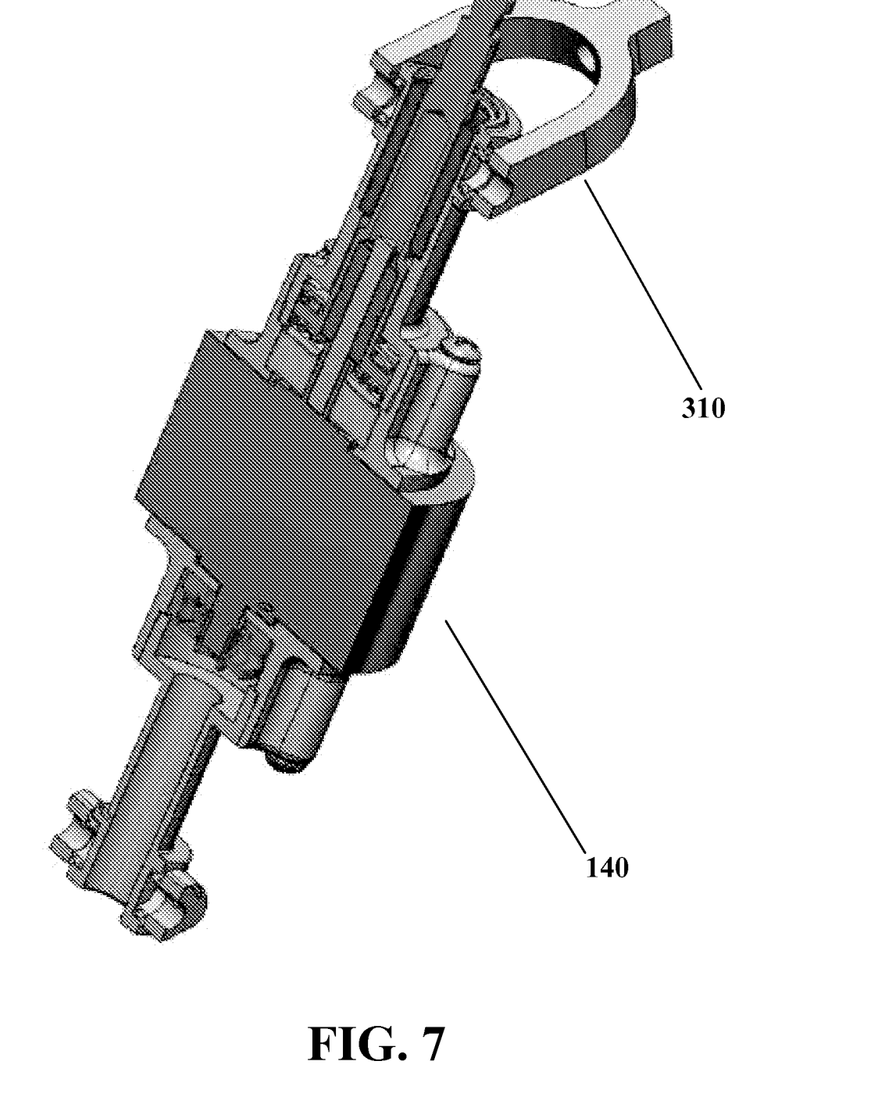
FIG. 7 is a sectional view of the torque assembly in accordance with an embodiment of the invention.
Figure 8:
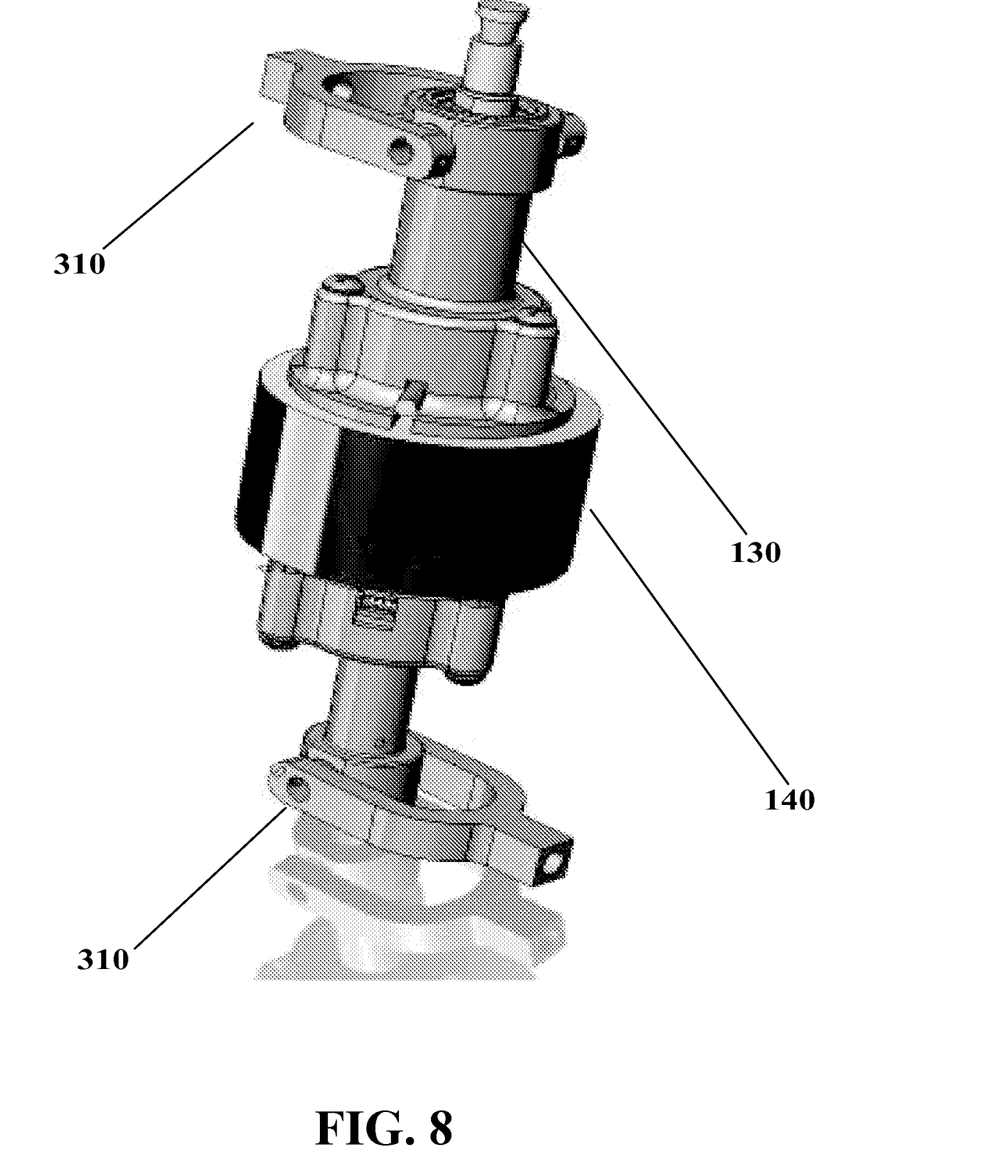
FIG. 8 is an isometric view of the torque assembly in accordance with an embodiment of the invention.

FIG. 7 is a sectional cutaway view of a torque assembly in accordance with an embodiment of the invention. A specific arrangement of the rotating shaft, the torque unit 140 and connection points for the end effectors 310 is illustrated. FIG. 8 illustrates the same structure, but in isometric view rather than sectional cutaway view. In this view, both end effectors 310 are included.

In an embodiment, force feedback is provided in only three degrees of freedom while six degrees of freedom are tracked.

In an embodiment, a data storage device is included for storage of simulation state information and performance data over course of single use scenario for later playback or analysis. Appropriate data storage may include, for example, optical or hard disk storage, network storage devices, or other appropriate storage facilities.

The foregoing illustrated embodiments are provided to illustrate the structural and functional principles of the present invention and are not intended to be limiting. For example, though reference is made herein to a computer, this may include a general purpose computer, a purpose-built computer, an ASIC programmed to execute the methods, a computer array or network, or other appropriate computing device. Though reference is made to measuring motions or forces, it should be understood that measuring of motions can include measuring position, velocity, acceleration, force, jerk, torque, moments or other quantities from which the motion may be derived. As a further example, it is to be understood that the present invention contemplates that, to the extent possible, one or more features of any embodiment can be combined with one or more features of any other embodiment. As a further example, though reference is made throughout to a burr hole simulation, the principles of the present invention may be applied to simulations of other medical or non-medical procedures. The principles of the present invention are intended to encompass any and all changes, alterations and/or substitutions within the spirit and scope of the following claims.

The invention claimed is:

1. An apparatus comprising:
a rotatable surgical tool;
two three-degree-of-freedom haptic devices, each of the three-degree-of-freedom haptic devices separately mechanically communicated to ground and operably and cooperatively communicated to the surgical tool and constructed and arranged to measure motions of the surgical tool and to apply resistance to the motions in six degrees-of-freedom in response to computed values for a simulated medical procedure wherein the six degrees-of-freedom comprise three translations and three rotations.

2. An apparatus as in claim 1, further comprising:
a load cell, constructed and arranged to measure force and moment in a direction along an axis of the surgical tool.

3. An apparatus as in claim 1, wherein the three-degree-of-freedom haptic devices are each connected to different points along an axis of a shaft of the rotatable surgical tool by a link, such that forces of the three-degree-of-freedom haptic devices are transmitted through the links to impart rotational moments and translational forces on the shaft.

4. An apparatus as in claim 1, further comprising an encoder constructed and arranged to measure a rotation of a shaft of the rotatable surgical tool.

5. An apparatus as in claim 1, further comprising an electromagnetic brake configured and arranged to receive a signal and to vary a rotational resistance of the rotatable surgical tool in response to the received signal.

6. An apparatus as in claim 1, wherein computed values for the simulated medical procedure comprise modeled forces and moments representing bone chip removal at a cutting face of a modeled drill bit interacting with modeled body materials in a working zone for the rotatable surgical tool.

7. An apparatus as in claim 6, wherein the modeled forces and moments comprise forces and moments computed from a finite element model describing forces and moments at a plurality of sampled volume elements.

8. An apparatus as in claim 7, wherein after initial modeled forces and moments are computed from the finite element model describing forces and moments at the plurality of sampled volume elements, subsequent modeled forces and moments comprise overall forces and moments on a simulated working portion of the rotatable surgical tool as a whole.

9. An apparatus as in claim 6, wherein the modeled forces and moments comprise net total forces and moments on a simulated working portion of the rotatable surgical tool as a whole.

10. An apparatus as in claim 1, wherein the rotatable surgical tool comprises a bone drill having a perforator bit for penetrating a skull of a surgical patient, and the simulated medical procedure comprises cranial burr hole drilling.

11. An apparatus as in claim 1, further comprising a display, configured and arranged to allow a user of the apparatus to view an image of the simulated medical procedure, the image being generated in response to input from the haptic devices and a model of an interaction between the rotatable surgical tool and a subject of the medical procedure.

12. A method of simulating a medical procedure comprising:
    measuring a user's manipulation of a rotating surgical tool in six degrees of freedom using two three-linear-degree-of-freedom haptic devices, wherein the six degrees-of-freedom comprise three translations and three rotations;
    modeling an interaction between the surgical tool and a subject of the medical procedure, based on the measured user's manipulation, including:
        modeling properties of materials present in an interaction region between the rotating surgical tool and the subject of the medical procedure,
        modeling an orientation of the rotating surgical tool;
        modeling a rotational speed of the rotating surgical tool;
        modeling forces between the surgical tool and portions of the interaction region based on the modeled properties, orientation and rotational speed; and
    providing feedback forces in at least three degrees of freedom to the manipulated surgical tool in accordance with the modeled forces, using the three-linear-degree-of-freedom haptic devices separately mechanically communicated to ground.

13. A method as in claim 12, wherein the modeling comprises mapping the interactions based on positions, forces and moments for each of a plurality of volume elements.

14. A method as in claim 13, wherein for positions including a region proximate a subject engaging cutting portion of the rotating surgical tool smaller volume elements are used while for positions distal the subject engaging cutting portion of the rotating surgical tool, larger volume elements are used.

15. A method as in claim 12, wherein the modeling further comprises modeling moments applied between the rotating surgical tool and the subject of the medical procedure.

16. A method as in claim 12, wherein, when the measuring measures an axial force on the rotating surgical tool that is less than a predetermined amount, the feedback forces are reduced to simulate disengagement of a clutch controlling transfer of rotational forces between a user-manipulated portion of the rotating surgical tool and a subject engaging cutting portion of the rotating surgical tool.

17. A method as in claim 12, wherein, upon reaching a predetermined simulated position in the medical procedure, reducing the feedback forces to simulate disengagement of a clutch controlling transfer of rotational forces between a user-manipulated portion of the rotating surgical tool and a subject engaging cutting portion of the rotating surgical tool.

18. A method as in claim 17, wherein the predetermined simulated position in the medical procedure represents a position corresponding to a completion of the simulated medical procedure.

19. A method as in claim 18, wherein the simulated medical procedure comprises drilling a burr hole and the position corresponding to a completion of the simulated medical procedure comprises penetration of the inner skull table by an inner section of a drill bit.

20. A method as in claim 12, wherein the modeling comprises defining a cylindrical occupancy map for volume elements of the rotating surgical tool and volume elements of a portion of the subject of the medical procedure wherein the rotating surgical tool is modeled as a cylinder and computations for the model are based on radially-directed planes passing through an axis of the rotating surgical tool.

21. A method as in claim 12, wherein each of the two three-degree-of-freedom haptic devices is separately mechanically communicated to ground.

* * * * *